United States Patent [19]

Haley

[11] Patent Number: 5,434,387
[45] Date of Patent: Jul. 18, 1995

[54] APPARATUS AND A METHOD FOR HEATING HEAT-RECOVERABLE ARTICLES WITH HEATER CONTROL TO PRODUCE UNIFORM AND NON-UNIFORM TEMPERATURE PROFILE

[75] Inventor: John M. Haley, Suffolk, England

[73] Assignee: British Telecommunications public limited company, London, England

[21] Appl. No.: 30,497

[22] PCT Filed: Jul. 31, 1991

[86] PCT No.: PCT/GB91/01300
§ 371 Date: Mar. 30, 1993
§ 102(e) Date: Mar. 30, 1993

[87] PCT Pub. No.: WO92/02355
PCT Pub. Date: Feb. 20, 1992

[30] Foreign Application Priority Data

Aug. 9, 1990 [GB] United Kingdom ............... 9017522

[51] Int. Cl.⁶ .................... B29C 61/00; H05B 3/58
[52] U.S. Cl. ........................... 219/535; 219/385; 219/521; 219/486; 156/296; 156/380.9; 156/381
[58] Field of Search ............... 219/535, 486, 485, 483, 219/412, 385, 521, 413, 390; 156/296, 379.8, 380.9, 381; 264/1.5; 385/95, 99

[56] References Cited

U.S. PATENT DOCUMENTS

| | | | |
|---|---|---|---|
| 1,282,330 | 10/1918 | Van Aller | 219/390 |
| 3,277,276 | 10/1966 | Nichol et al. | 219/421 |
| 3,385,953 | 5/1968 | Henneberger | 219/535 |
| 4,238,670 | 12/1980 | Maitenaz | 219/486 |
| 4,334,146 | 6/1982 | Sturm | 219/535 |
| 4,460,820 | 7/1984 | Matsumoto et al. | |
| 4,605,161 | 8/1986 | Motomiya et al. | 219/388 |
| 4,618,168 | 10/1986 | Thalmann et al. | 219/535 |
| 4,695,335 | 9/1987 | Lyall | 219/535 |
| 4,897,932 | 2/1990 | Kuriyama | |
| 4,948,435 | 8/1990 | Butler et al. | 148/127 |
| 5,030,810 | 7/1991 | Haley et al. | 219/385 |

FOREIGN PATENT DOCUMENTS 0304333 2/1989 European Pat. Off. .
62-207614 9/1987 Japan .

Primary Examiner—John A. Jeffery
Attorney, Agent, or Firm—Nixon & Vanderhye

[57] ABSTRACT

A device and a method for shrinking heat recoverable sleeves for covering cable joints comprising a heating device the interior of which has a plurality of independently energizable heating elements and at least one sensor and a control circuit or control circuits which are connected to the heating elements and the at least one sensor. The control circuit is arranged to produce a uniform and then a non-uniform temperature profile within the heating device unless the initial temperature within the heating device is above a given temperature (e.g.) 30° C. in which case the control circuit waits until the temperature within the heating device falls to below the given temperature before producing the temperature profiles whereby sleeved cable joints of a uniform quality are produced by avoiding air entrapment within the sleeve during the shrinking process.

15 Claims, 3 Drawing Sheets

APPARATUS AND A METHOD FOR HEATING HEAT-RECOVERABLE ARTICLES WITH HEATER CONTROL TO PRODUCE UNIFORM AND NON-UNIFORM TEMPERATURE PROFILE

BACKGROUND OF THE INVENTION

1. Field of the Invention

The present invention relates to apparatus for, and a method of, heating heat-recoverable articles, and more particularly to such apparatus and such a method for effecting recovery of heat-shrinkable cable closures.

2. Related Art

Heat-recoverable sleeving is often used to protect joins in electrically conducting cables and in optical fiber signalling lines. In use, a sleeve is passed over one end of a cable, for example a cable having multiple pairs of signalling wires and, once jointing of one cable to another cable has been completed, the sleeve is relocated over the joint area, the sleeve spanning the ends of the respective insulating jackets of the cables. Alternatively, after the joint has been formed, a split sleeve is positioned over the jointing area, and is sealed using a hot melt adhesive or other heat-activated sealing material. Heating the sleeve causes it to shrink and grip tightly around the cable jacket and the joint area, thereby effecting water resistance and insulation. Care must be taken during the shrinking operation to ensure that air entrapment is limited.

Thus, for example, if the ends of a sleeve are recovered too rapidly, so that sealing of the sleeve to the insulating cable jackets prevents air from escaping, then the central portion of the sleeve may be prevented from shrinking fully onto the joint area by the entrapped air. Accordingly, skilled operators are employed to effect the shrinking operation, usually by applying a gas torch to the sleeve area, and moving the torch from the center towards the ends.

However, as will be appreciated, many such jointing operations are performed in restricted areas, such as in underground cable chambers, where the effects of combustion products may be dangerous to the operator. Furthermore, the use of a naked flame in such chambers, in which a build up of combustible or explosive gases is possible, should preferably be avoided.

One solution to the above problem has been disclosed in U.S. Pat. No. 5,030,810 which has been made by the present patent. In the aforementioned application, there is disclosed a portable heating device comprising a body forming an elongate enclosure, the interior of which has independently-energizable electrical heating elements, whereby the longitudinal temperature profile within the enclosure, may be controlled. The body comprises two half cylinders hinged on one side. Thus, by placing a sleeved joint in the elongate body, and then energizing the heating elements, the central portion reaches recovery temperature very quickly, while the outer portions reach that temperature more gradually.

It has been found using the heating device disclosed in U.S. Pat. No. 5,030,810 that the quality of the insulation and water resistance of the joint after shrinkage of the heat recoverable sleeve is affected by the temperature inside the enclosure at the time the heating device commences operation. In particular, it has been found that the heating device may produce sleeved joints of poor insulation and water resistance at commencement temperatures below zero degrees fahrenheit.

BRIEF SUMMARY OF THE INVENTION

The aim of the invention is to provide apparatus for, and a method of, effecting recovery of a heat-shrinkable article in a controllable manner to produce sleeved joints of uniform quality.

The present invention provides apparatus for applying heat to heat-recoverable articles, the apparatus comprising a heating device, a plurality of independently-energizable electrical heating elements within the heating device, at least one sensor for sensing the actual temperature within the heating device, and a control circuit connected to the heating elements and to the or each sensor, the control circuit being capable of independently energizing the heating elements and, by using the or each sensor, detecting the actual temperature within the heating device, whereby the control circuit heats the heating device using a uniform or near uniform temperature profile within the heating device until a pre-set temperature is reached within the heating device, and subsequently heats the heating device using a non-uniform temperature profile within the heating device for a period of time sufficient to cause heat recovery.

The invention also provides apparatus for applying heat to heat-recoverable articles, the apparatus comprising a heating device with an interior containing a plurality of independently-energizable electrical heating elements, at least one temperature sensor within the heating device for sensing the internal temperature of the heating device, and a control circuit connected to the heating elements and to the or each sensor for measuring the initial temperature of the heating device and selecting a heating profile dependent thereon to effect heat recovery.

Preferably the heating device has a cylindrical body, and comprises two half cylinders hinged on one side to simplify access to the interior of the heating device.

The body of the heating device may have removable end plates which include apertures through which one or more cables and one or more heat-recoverable articles may pass. The end plates may be relocated to reduce the size of the interior of the body of the heating device, which may also include in its interior one or more support plates and/or thermal baffles.

The control circuit may produce the temperature profile within the interior of the heating device by sequential energization. The energization sequence may have a predetermined time interval between each step thereof or the energization sequence may be related to the actual temperature profile within the body of the heating device.

The control circuit may be arranged to cause energization of the heating elements closest to the center of the heat-recoverable article prior to energization of heating elements away from the center of the heat recoverable article.

The invention further provides a method of applying heat to a heat-recoverable article in apparatus which comprises a body the interior of which has a plurality of independently-energizable electrical heating elements and means for sensing and indicating the actual temperature within the body, the method comprising the steps of placing the heat-recoverable article together with a joint or joints to be covered within the body, energizing the heating elements to produce a uniform or near uniform temperature profile within the body until a pre-set temperature is indicated, and energizing the heating elements to produce a non-uniform temperature profile within the body for a period of time.

The invention also provides a method of applying heat to a heat-recoverable article in apparatus having an interior with a plurality of independently-energizable electrical heating elements and temperature sensing means, the method comprising the steps of placing the heat-recoverable article together with a joint or joints to be covered within the apparatus, sensing the internal temperature of the apparatus, and selecting a heating profile dependent on the sensed temperature to effect heat recovery.

BRIEF DESCRIPTION OF THE DRAWINGS

Apparatus constructed in accordance with the invention will now be described, by way of example, with reference to the accompanying drawings, in which.

DETAILED DESCRIPTION OF EXEMPLARY EMBODIMENTS

Figure 1:
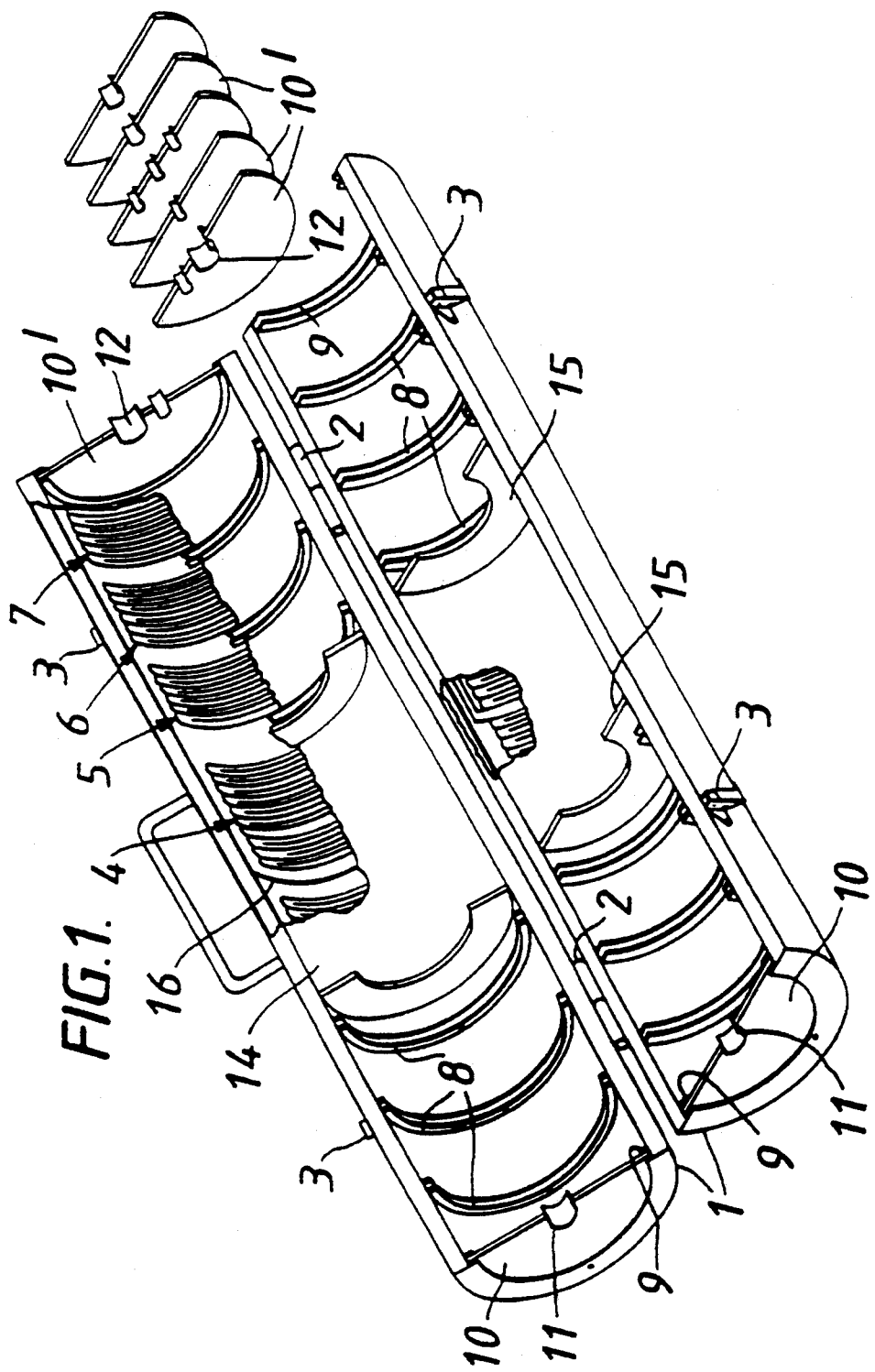
FIG. 1 is an isometric view of a heating device for effecting shrinkage of a heat recoverable cable joint sleeve.

Referring to FIG. 1 the heating device comprises a housing in the form of two half cylinders 1 of thermally insulating material. The two half cylinders 1 are linked together by "lift-off" hinges 2 on one edge and have the respective halves of clamp arrangements 3 of known kind on the opposed edges. Thus the two half cylinders 1 may in use be locked together using the clamps 3 to form a cylindrical oven enclosure.

Embedded in the walls of the body of the heating device a number of groups of electric heating elements 4 to 7 (only some of which are shown) are provided, each having an individual connection wire (not shown) for power to be supplied from a controller. Between each group of heating elements 4 to 7, and at each end of the half cylinders, mounting guides 8, 9 may be provided to which end plates 10 may be fitted.

Each end plate 10 includes one or more semicircular grooves 10 arranged on closure of the cylinder to form an aperture. The grooves 11 each carry a support plate 12 which, in use, provides support to the ends of a jointed cable (not shown). Several pairs of interchangeable end plates may be provided to cater for different cable sizes. For example the end plates 10 are adapted for use with a single cable of a larger diameter while the end plates 10' take a similar cable and a smaller cable.

Other exemplary end plates for a single smaller diameter cable, three such cables and a cable of intermediate diameter are also shown at 10'.

For the avoidance of doubt the term cables as used herein includes not only multi cored electrical signalling cables but also cables comprising of multiple optical fibers co-axial cables and the like.

The interior of the half cylinder shells 1 comprises a heat radiating surface 14 which is preferably coated with a "non-stick" material such as Teflon (trademark) to facilitate the removal of (e.g.) hot melt adhesives which may have been used in the jointing process.

As shown in the diagram, adjacent the groups of heating elements 4 nearest the longitudinal center of the enclosure a further pair of plates 15 are provided. The plates 15 have two functions the first of which is to give support to a cable when it is in the enclosure and the second of which is to act as a thermal baffle to prevent premature temperature rises along the length of the cylinder.

It will be realized that, as with the end plates 10, the plates 15 may be located in different positions along the length of the half cylinders 2 either using the same mountings 8 or additional mountings (not shown). It will also be appreciated that the plates 15 may carry extensions similar to the shells 12 to provide additional longitudinal support.

To enable the control of the temperature profile along the length of the enclosure one or more thermocouples 16 are incorporated in the walls of the shells 1 as thermal sensors.

Figure 2:
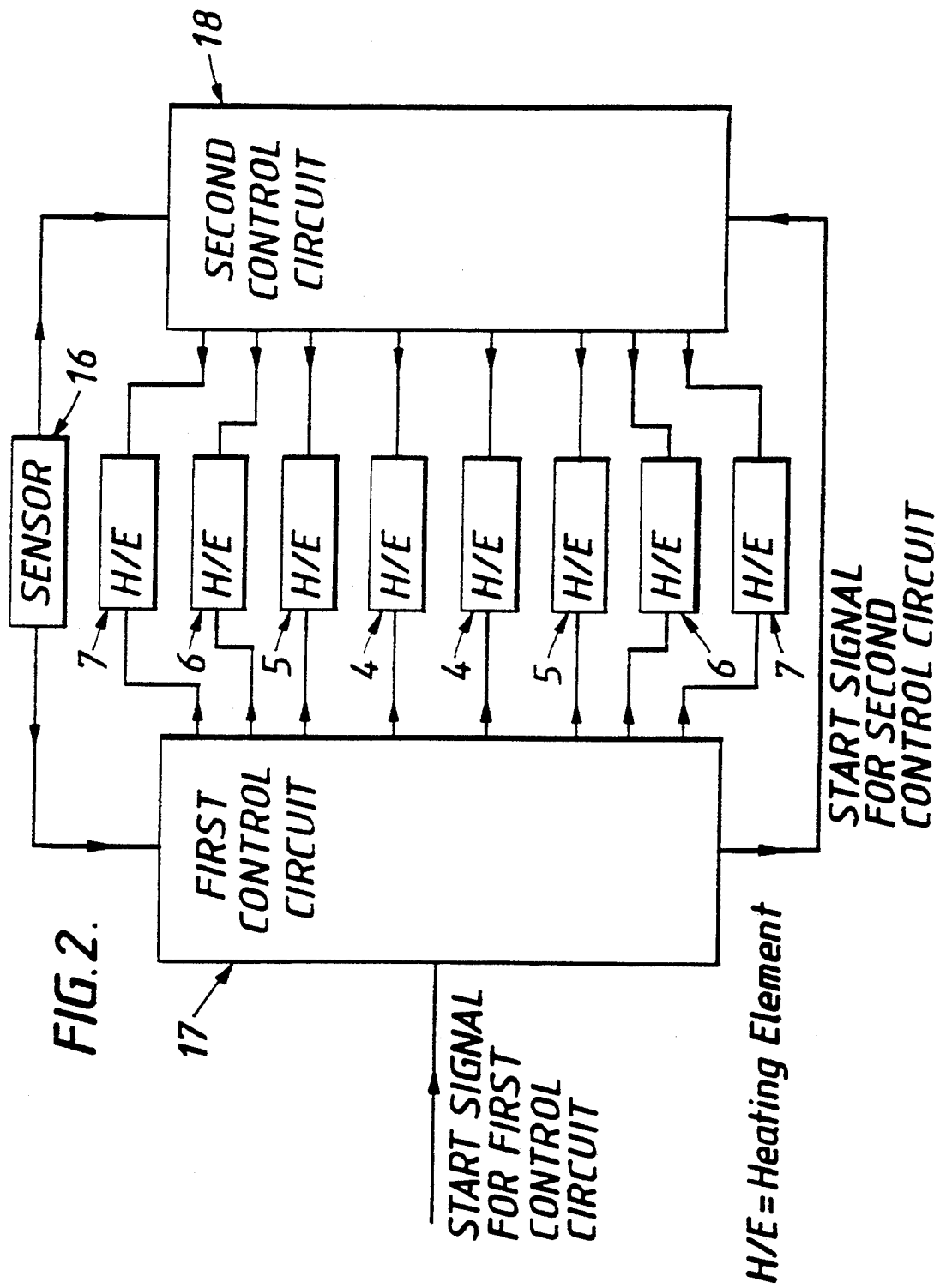
FIG. 2 is a schematic diagram indicating the apparatus used to control the temperature of the heating device.

Referring to FIG. 2 the sensor 16 and heating elements 4, 5, 6 and 7 perform the functions as previously described and are connected to a first control circuit 17 and a second control circuit 18.

If the temperature sensed by sensor 16 within the body (internal temperature) is below the trigger temperature the first control circuit 17 energises the heating elements 4, 5, 6 and 7 to produce a uniform or near uniform temperature profile within the body (the pre-heat cycle) until the internal temperature reaches a pre-set temperature (the pre-set temperature). If the internal temperature is at or above the trigger temperature the first control circuit 17 will wait until the internal temperature falls below the trigger temperature before energizing, in the mode referred to above (i.e. the pre-heat cycle) the heating elements 4, 5, 6 and 7. A typical trigger temperature is 30° Centigrade and a typical pre-set temperature is 40° Centigrade.

Upon completion of the pre-heat cycle, the second control circuit 18 will energize the heating elements 4, 5, 6 and 7 to produce a non-uniform temperature profile within the body (the shrinkage cycle) to ensure shrinkage of the recoverable sleeve within the heating device occurs without trapping air within the sleeve (as discussed above).

In use, where two or more cables are to be joined a suitable heat recoverable sleeve is selected and placed over one of the cables. Once jointing or splicing of the cables is completed, the joint area or the inside of the sleeve may be coated with a hot melt adhesive if required and the sleeve positioned thereover. Alternatively a split sleeve pre-coated with hot melt adhesive is selected and wrapped over the joint area after completion of splicing or jointing.

Suitable end plates 10 are selected and placed in respective mountings 8, 9 in dependence upon the length of the joint to be sealed together with the intermediate support/thermal baffle plates 15 as necessary. The two half shells 1 are then positioned so that the jointed cables rest in the supports 12 and the enclosure is closed and locked together using the clamps 3. Connection leads from the heating elements 4 to 7 and the thermal sensor(s) 16 may now be connected to the controller. The operator provides the joint parameters on the controller, for example the type and length of joint, the kind of sleeving in use and starts the sequence.

Figure 3:
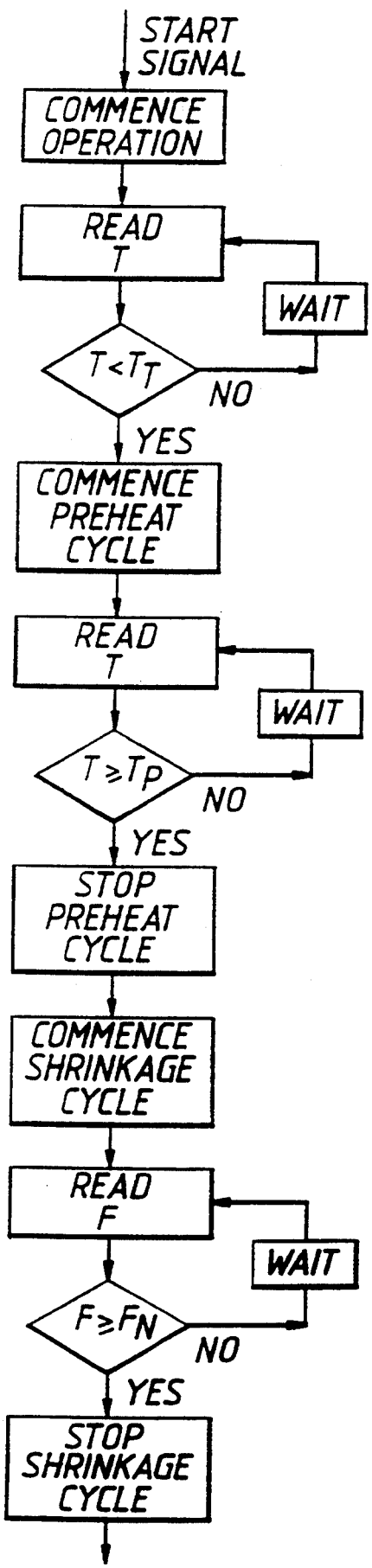
FIG. 3 is a flow diagram indicating the operation of the apparatus.

Referring to FIGS. 2 and 3, the first control circuit 17 and the second control circuit 18 which may be conveniently provided by using custom built Programmed Logic Control or a microprocessor, now steps through the following predetermined sequences releasing the operator to perform other tasks. In FIG. 3, T=Internal Temperature; $T_t$=Trigger Temperature; $T_p$=Preset Temperature; F=Either time or temperature; and $F_n$=Either respectively a predetermined time or a predetermined temperature.

In a typical sequence, a signal is sent to the first control circuit 17 instructing it to initiate energization of the heating device (the commence pre-heat signal). Using sensor 16, the first control circuit 17 senses the internal temperature and if the internal temperature is below the trigger temperature the first control 17 circuit initiates the pre-heat cycle.

During the pre-heat cycle the first control circuit 17 energizes the heating elements 4, 5, 6 and 7 either in a sequence or randomly to avoid overloading the power supply, which may be conveniently a battery or a generator, to produce a uniform or near uniform internal temperature until the internal temperatures reaches the pre-set temperature. When the internal temperature reaches the pre-set temperature, the first control circuit 17 ceases energization of the heating elements 4, 5, 6 and 7 and sends a signal to the second control circuit 18 to carry out the shrinkage cycle (the commence shrinkage signal). If on receipt of the commerce pre-set signal, the internal temperature is at or above the trigger temperature, then, the first control circuit 17 will monitor the internal temperature using sensor 16 and wait until the temperature is below the trigger temperature before carrying out the pre-heat cycle and subsequently sending the commence shrinkage signal as described above.

Once the commence shrinkage signal has been received by the second control circuit 18, the second control circuit 18 commences the shrinkage cycle.

In a typical shrinkage cycle the second control circuit 18 first causes the two groups of elements 4 closest to the centre of the enclosure to be energized for a short period of time which may be either a predetermined period (say five minutes) or may be until a given temperature as sensed by sensor 16 is reached.

This initial heating of the central area of the joint ensures that shrinkage if that portion of the recoverable sleeve occurs before any likelihood of the sleeve sealing to the insulated sleeving of the cables thereby allowing entrapped air to escape.

In the next step of the shrinkage cycle, the second control circuit 18 causes the next to center groups of elements 5 to be energized again for a predetermined period or until a given temperature is sensed during which period the elements 4 may either remain energized or be turned off as required. The groups of elements 6 and 7 may then be energized in turn. It will be realized that a combination of the time and temperature factors may be used such that at each step mentioned above a predetermined period elapses after a given temperature is reached prior to proceeding to the next step.

While as herein described during the shrinkage cycle the heating elements 4, 5, 6 and 7 are controlled to heat a central area first progressing outwardly to the ends it will be appreciated that the longitudinal temperature profile of the enclosure may be controlled in any required manner. For example if sealing of one end is preferred prior to sealing of the opposed end then during the shrinkage cycle the second control circuit 18 may energize the heating elements in the order 7, 6, 5, 4 at one end of the enclosure followed by the corresponding heating elements in the order 4, 5, 6, 7 at the opposed end of the enclosure.

Further although the device has been described with reference to a preformed heat recoverable sleeve other thermally responsive mechanisms such as sheets of material wrapped around a joint may be used.

The control circuit could include a number of look up tables, for example, to allow different temperature profiles and equencing including a waiting period to be effected dependent on the initial measured internal device temperature for example.

I claim:

1. A method of applying heat to a heat-recoverable article in apparatus having an interior with a plurality of independently-energizable electrical heating elements and temperature sensing means, the method comprising the steps of:

placing a heat-recoverable article together with at least one joint to be covered within the apparatus, sensing the internal temperature of the apparatus, and selecting a heating profile dependent on the sensed temperature to effect heat recovery.

2. A method as in claim 1, further comprising the step of selecting the profile from a plurality of profiles.

3. A method of applying heat to a heat-recoverable article in apparatus which comprises a body the interior of which has a plurality of independently-energizable electrical heating elements and means for sensing and indicating the actual temperature within the body, the method comprising the steps of:

placing the heat-recoverable article together with at least one joint to be covered within the body.

energizing the heating elements to produce an approximately uniform longitudinal temperature profile within the body until a pre-set temperature is indicated, energizing the heating elements to produce a non-uniform longitudinal temperature profile within the body for a period of time;

determining if the at least one temperature indication means indicates at least one internal device temperature at or above a predetermined temperature, and then waiting until the at least one internal temperature falls below the predetermined temperature before energizing the heating elements to produce the approximately uniform longitudinal temperature profile.

4. Apparatus for applying heat to heat-recoverable articles, the apparatus comprising:

a heating device with an interior containing a plurality of independently-energizable electrical heating elements.

at least one temperature sensor within the heating device for sensing the internal temperature of the heating device, and a control circuit connected to the heating elements and to the at least one sensor for measuring the initial temperature of the heating device and selecting a heating profile dependent thereon to effect heat recovery.

wherein the control circuit is configured to select a profile from a plurality of profiles.

5. Apparatus for applying heat to heat-recoverable articles, the apparatus comprising:

a heating device, a plurality of independently energizable electrical heating elements within the heating device, at least one sensor for sensing actual temperature within the heating device, and a control circuit connected to the heating elements and to the at least one sensor, the control circuit including means for independently energizing the heating elements and which, by using the at least one sensor heats the heating device using an approximately uniform longitudinal temperature profile within the heating device until a pre-set temperature is reached within the heating device, and subsequently heats the heating device using a non-uniform longitudinal temperature profile within the heating device for a period of time sufficient to cause heat recovery, the control circuit being configured to wait until the internal device temperature falls to below a predetermined temperature before it energizes the heating elements to produce the approximately uniform temperature profile within the heating device, the predetermined temperature being less than the pre-set temperature.

6. Apparatus as in claim 5, wherein the heating device has a cylindrical body.

7. Apparatus as in claim 6, wherein the heating device is formed in two parts interconnected by a hinge means, whereby access to the interior of the body of the heating device is simplified.

8. Apparatus as in claim 5, wherein ends of the body of the heating device are closed by removable end plates.

9. Apparatus as in claim 8, wherein the end plates each include at least one aperture to permit the body of the heating device to surround a portion of at least one cable and at least one heat-recoverable article.

10. Apparatus as in claim 8, wherein the body of the heating device includes mounting means intermediate at least one pair of the plurality of elements, whereby at least one of the end plates may be relocated to reduce the interior of the heating device.

11. Apparatus device as in claim 5, wherein at least one support plate is located within the heating device, whereby an elongate article within the heating device may be additionally supported towards the center of the heating device.

12. Apparatus as in claim 5, wherein a thermal baffle is located intermediate at least one pair of the plurality of heating elements.

13. Apparatus as in claim 5, wherein the control circuit is arranged, during the production of a temperature profile, to cause energization of the heating elements in a predetermined sequence, with a predetermined period of time between each step of the sequence.

14. Apparatus as in claim 5, wherein the control circuit is arranged, during the production of a temperature profile, to cause the sequential energization of the heating elements in dependence upon the actual temperature within the heating device sensed by the at least one sensor.

15. Apparatus as in claim 5, wherein the control circuit is arranged, during the production of a non-uniform temperature profile, to cause energization of at least one heating element closest to the center of the heat-recoverable article, before causing energization of heating elements disposed away from the center of the heat recoverable article.

* * * * *